United States Patent
Zhang et al.

(10) Patent No.: US 11,308,053 B2
(45) Date of Patent: Apr. 19, 2022

(54) BUFFERED DATA-LOADING IN COLUMN-PARTITIONED DATABASE TABLES

(71) Applicant: Teradata US, Inc., Dayton, OH (US)

(72) Inventors: Rui Zhang, Redondo Beach, CA (US); Sanjay Nair, El Segundo, CA (US); Paul Laurence Sinclair, Manhatten Beach, CA (US); Mamatha Govind Rao, Bangalore (IN)

(73) Assignee: Teradata US, Inc., San Diego, CA (US)

(*) Notice: Subject to any disclaimer, the term of this patent is extended or adjusted under 35 U.S.C. 154(b) by 1338 days.

(21) Appl. No.: 15/336,063

(22) Filed: Oct. 27, 2016

(65) Prior Publication Data

US 2017/0116237 A1   Apr. 27, 2017

Related U.S. Application Data

(60) Provisional application No. 62/246,653, filed on Oct. 27, 2015.

(51) Int. Cl.
G06F 16/22 (2019.01)
G06F 16/27 (2019.01)
G06F 16/25 (2019.01)

(52) U.S. Cl.
CPC .......... *G06F 16/221* (2019.01); *G06F 16/254* (2019.01); *G06F 16/278* (2019.01)

(58) Field of Classification Search
CPC .... G06F 16/221; G06F 16/278; G06F 16/254; G06F 16/27
See application file for complete search history.

(56) References Cited

U.S. PATENT DOCUMENTS

| | | | | |
|---|---|---|---|---|
| 2013/0073515 A1* | 3/2013 | Bhide | ................... | G06F 16/254 707/602 |
| 2014/0114907 A1* | 4/2014 | Kozina | ................. | G06F 16/283 707/602 |
| 2015/0178305 A1* | 6/2015 | Mueller | ................ | G06F 16/221 707/693 |
| 2015/0213071 A1* | 7/2015 | Alvey | .................... | G06F 16/221 707/803 |
| 2016/0078079 A1* | 3/2016 | Hu | ....................... | G06F 16/2365 707/803 |

* cited by examiner

*Primary Examiner* — Vaishali Shah
(74) *Attorney, Agent, or Firm* — James Stover

(57) ABSTRACT

A system and method for loading data into column-partitioned database tables. The system and method incorporate a mechanism for buffering data extracted from the rows of a source table in column-oriented fashion within an in-buffer memory, enabling an efficient bulk-write of large arrays of values from the buffer into column-partitioned database tables. The system and method may also include optimizations for grouping columns according to data types and altering the order in which columns are inserted into the database tables.

16 Claims, 6 Drawing Sheets

US 11,308,053 B2

BUFFERED DATA-LOADING IN COLUMN-PARTITIONED DATABASE TABLES

CROSS REFERENCE TO RELATED APPLICATIONS

This application claims priority under 35 U.S.C. § 119(e) to the following commonly-assigned patent application, which is incorporated herein by reference:

Provisional Patent Application Ser. No. 62/246,653, entitled "BUFFERED DATA-LOADING IN TERADATA COLUMNAR TABLES," filed on Oct. 27, 2015, by Rui Zhang, Sanjay S. Nair, Mamatha Govind Rao, and Paul Sinclair.

This application is related to the following commonly-assigned patent application, which is incorporated by reference herein:

Application Ser. No. 14/135,497, entitled "PROCESSING COLUMN-PARTITIONED DATA FOR ROW-BASED OPERATIONS IN A DATABASE SYSTEM," filed on Dec. 19, 2013, by Paul Sinclair, Grace Au, Sanjay S. Nair, and David O. Craig;

FIELD OF THE INVENTION

The present disclosure relates generally to processing column-partitioned database tables, and more particularly to improved methods for loading data into column-partitioned database tables.

BACKGROUND OF THE INVENTION

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

Some database tables may be capable of partitioning database tables by column and by row. This column-oriented storage model provides significant performance benefit to analytic queries that reference a small subset of columns from a table with many columns. To maximize this performance benefit, data is often loaded into column-store tables from conventional row-oriented tables. Typically, periodic ETL tasks are scheduled to perform such data loading. Therefore, the efficiency of executing the loading is of critical importance to the subsequent analytics carried out on the column-store tables.

One major advantage of column-store is that the data belonging to the same column can be tightly packed and stored in consecutive storage space. This storage model enables highly efficient vectorized data manipulation. For instance, in evaluating a predicate that involves a particular column, the runtime executed code that evaluates each value is going to be identical for all the values from this column. Hence evaluating these values in a vectorized manner by retaining a relatively small set of machine instructions from the evaluation routines in CPU cache can yield promising performance benefit.

Traditionally, loading data into a table is considered an I/O-bound task. Nevertheless, loading a column-store table can be highly CPU-intensive. This is because when loading rows into a column-store table, the values from each row need to be split and copied into their corresponding column storage. This individual-value based loading mechanism can often become a bottleneck in terms of CPU time. In particular nowadays, with I/O activities performed more efficiently, for instance, with solid-state drives that support fast random-read/write access, it is essential to focus on improving the efficiency of data loading with respect to CPU.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Initially, it is noted that specific embodiments and sample implementations for various aspects of the invention are provided in detail the U.S. Provisional Application No. 62/246,653, which is incorporated by reference in its entirety herein.

Figure 1:
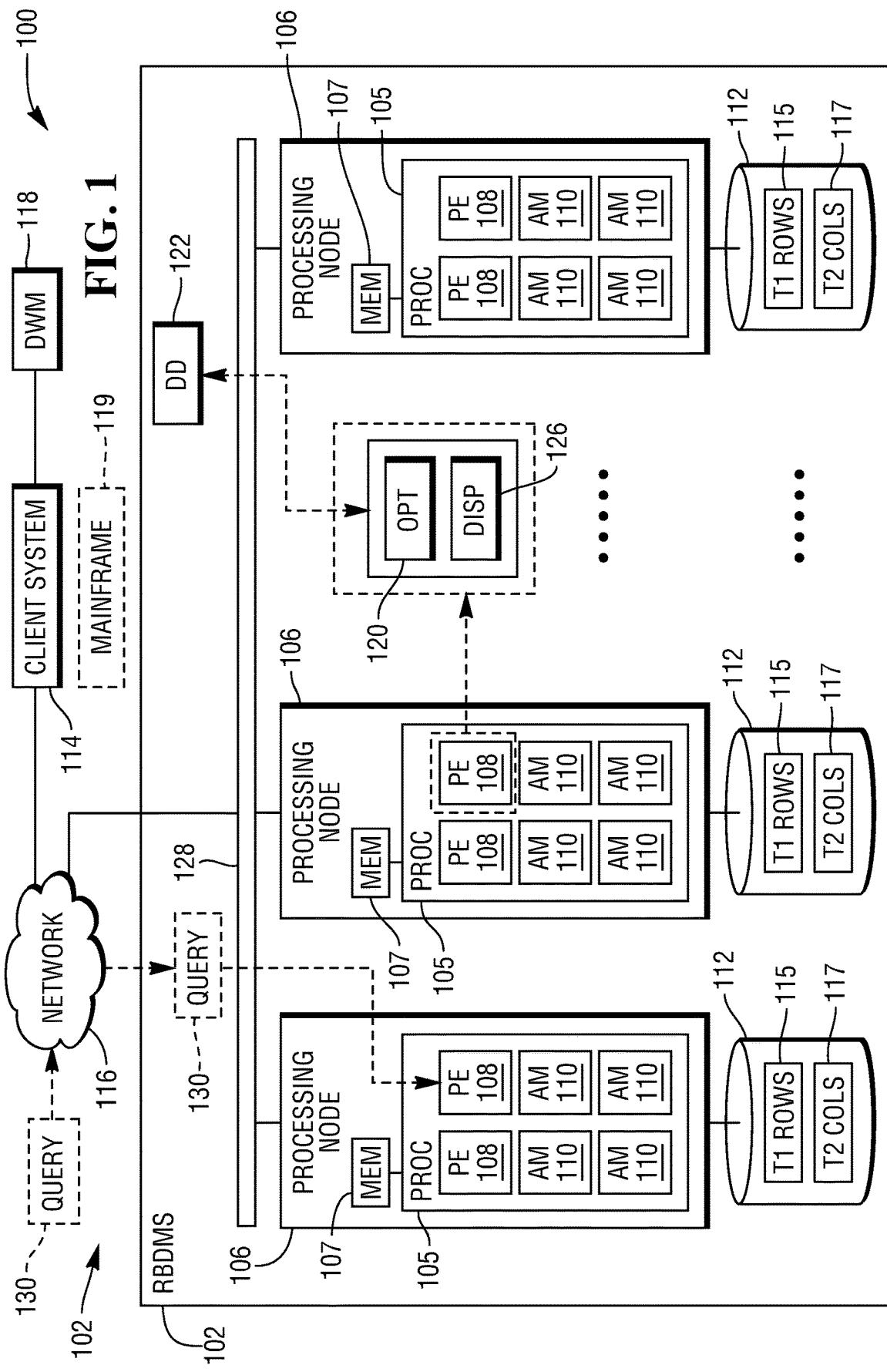
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RBDMS 102 may be a massive parallel processing (MPP) system having an array of processing units and distributed memory. In alternative examples, the RBDMS 102 may implement a single processing unit, such as in a symmetric multiprocessing (SMP) system configuration. The RBDMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing units such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access module processors (AMPS), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RBDMS 102 stores data in one or more tables in the DSFs 112. In one example, the database system 100 may be configured to distribute rows across access modules 110 and their associated DSFs 112 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to associated access modules 110 by a hash bucket map. The characteristics of the columns chosen for the primary index determine how evenly the rows are distributed. Alternatively, rows read from external sources may be randomly distributed to access modules 110 or, if internal sources, rows can be locally copied, randomly distributed, or hashed distributed to access modules 110.

For an access module 110, rows of each stored table may be stored DSFs 112, such as rows 115 to table T1 and columns 117 of table T2. The rows may be partitioned by row and/or column. Partitioning by rows is determined by one or more user-specified partitioning expressions. Partitioning by column is determined by user-specified grouping of one or more columns into each column partition. Each parsing engine module 108 may organize the storage of data and the distribution of table rows and columns. The parsing engine modules 108 may also coordinate the retrieval of data from the DSFs 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary 122 may be stored in the DSFs 112 or some other storage device and selectively accessed.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally, or alternatively, more than one channel may also allow distributed communication to reduce the possibility of an undesired level of communication congestion among processing nodes 106.

Figure 2:
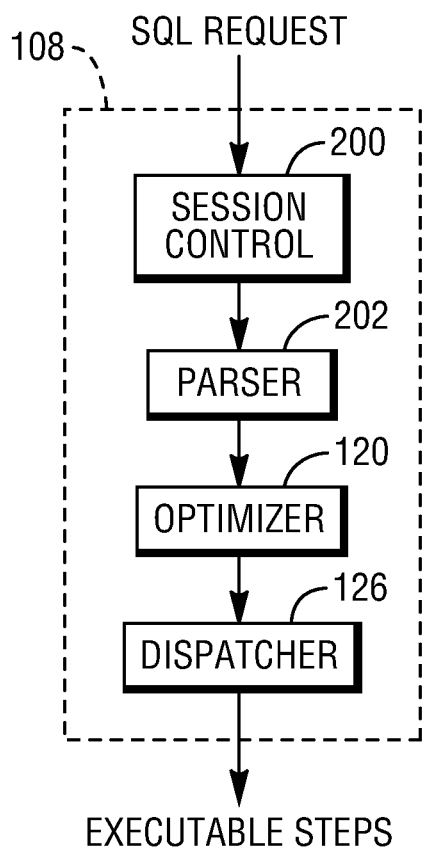
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
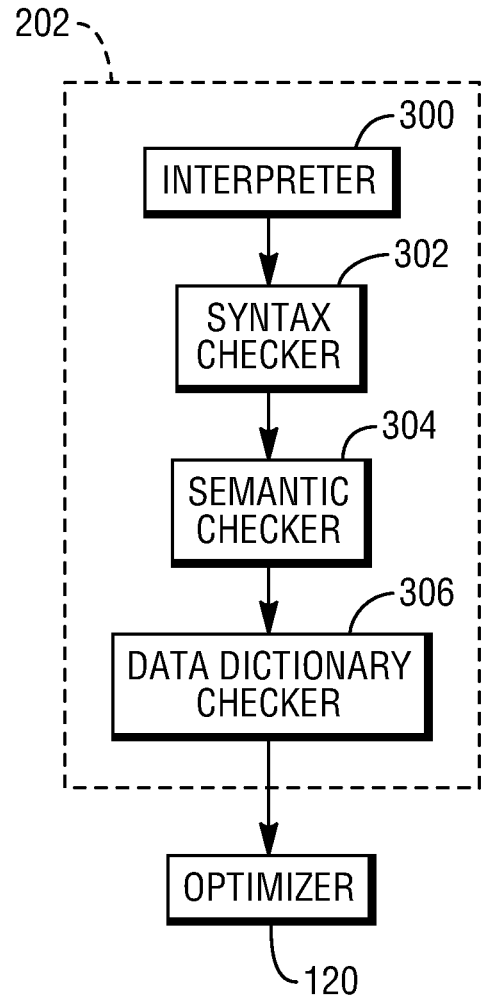
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

During operation, a query, such as the query 130, or utility may require the database system 100 to perform a row-based operation. This requires relevant rows to be located by a file system and returned for subsequent processing. However, column-partitioning presents issues related to row-processing. As data tables are column-partitioned, partitioned columns of a row may be distributed throughout the DSFs 112 associated with the access module 110 that manages that row. Thus, rows are broken up into the column partitions. Such partitioning requires the access module 110 to spend time gathering each referenced column value of a row in order for the row to be processed.

Columns may be partitioned by the database system 100 and placed into physical storage, or "physical rows," of storage disks of the DSFs 112. In one example, the partitioned columns may be assigned a column partition number. Each column partition may include a number of container rows in which in the column values are stored. The length and number of container rows is dependent upon the number of column values and the size of the column values. When column partitioning a database table, the partitions may vary in placement, such that more than one column may be part of a column partition. Each of the container rows of a column partition may include one or more column partition values. Each column partition value may represent one or a concatenation of more than one column value. During query processing, referenced column-partitioned column values need to be accessed. Thus, these column values may each be associated with an identifier so that the column values can be located when needed.

Figure 4:
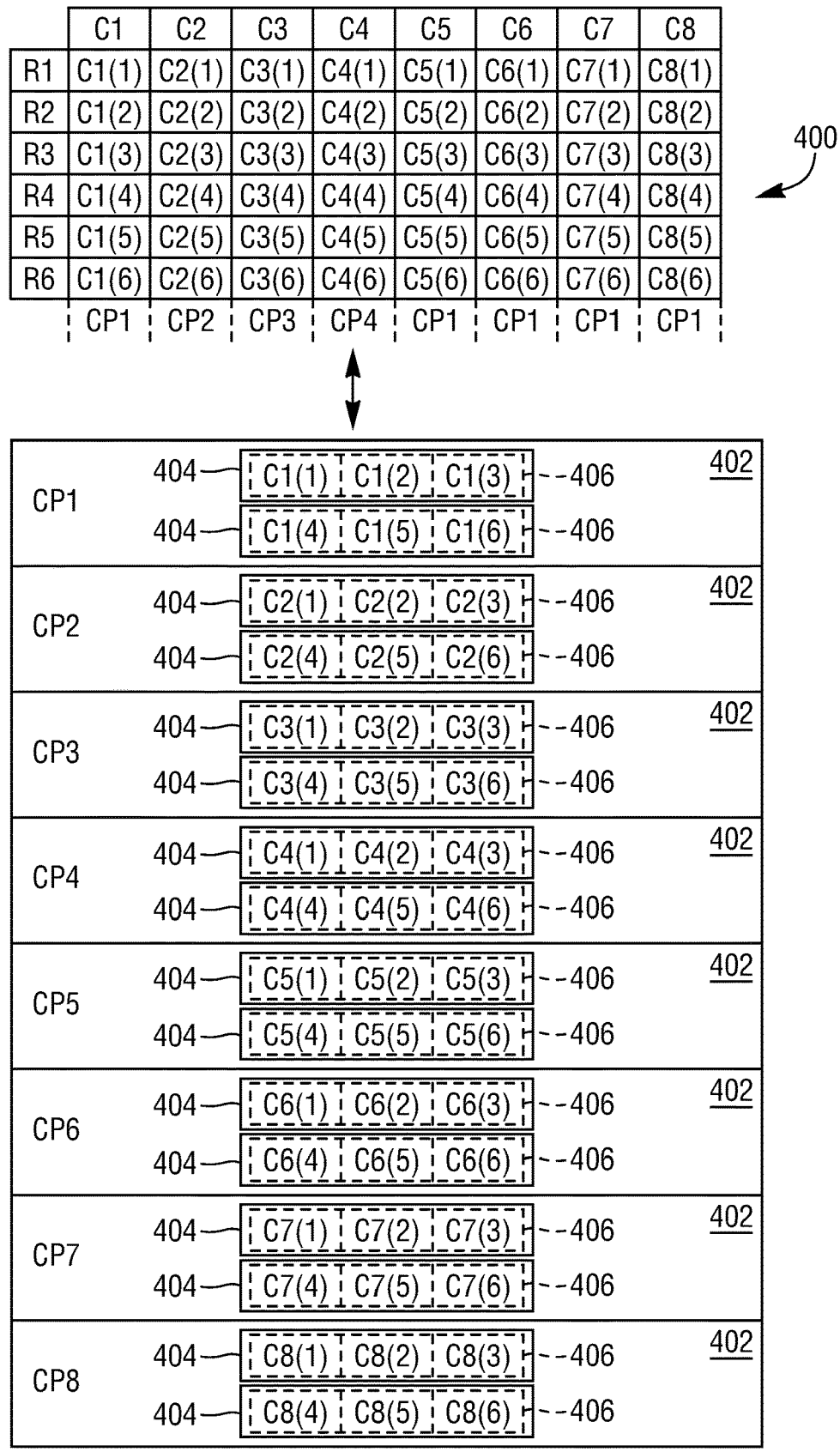
FIG. 4 is an example of column partitioning of a database table.

FIG. 4 shows an example of a table 400 being partitioned into a number of column partitions 402. Table 400 includes six rows, R1 through R6, eight columns C1 through C8. Each column is partitioned into a separate column partition 402. The partitioned column values may be placed into column container rows 404 within each column partition 402. Each container row 404 includes a number of column partition values 406. In FIG. 4, each column partition value 404 may represent one or more column values. In the example in FIG. 4, each column partition value 404 includes a single column entry. Each column partition value 404 may be associated with a unique identifier field referred to as a "rowid." The rowid may be a combination of various other identifiers. In one example, the rowid may include a column partition number, hash bucket value, and a uniqueness value.

Figure 5:
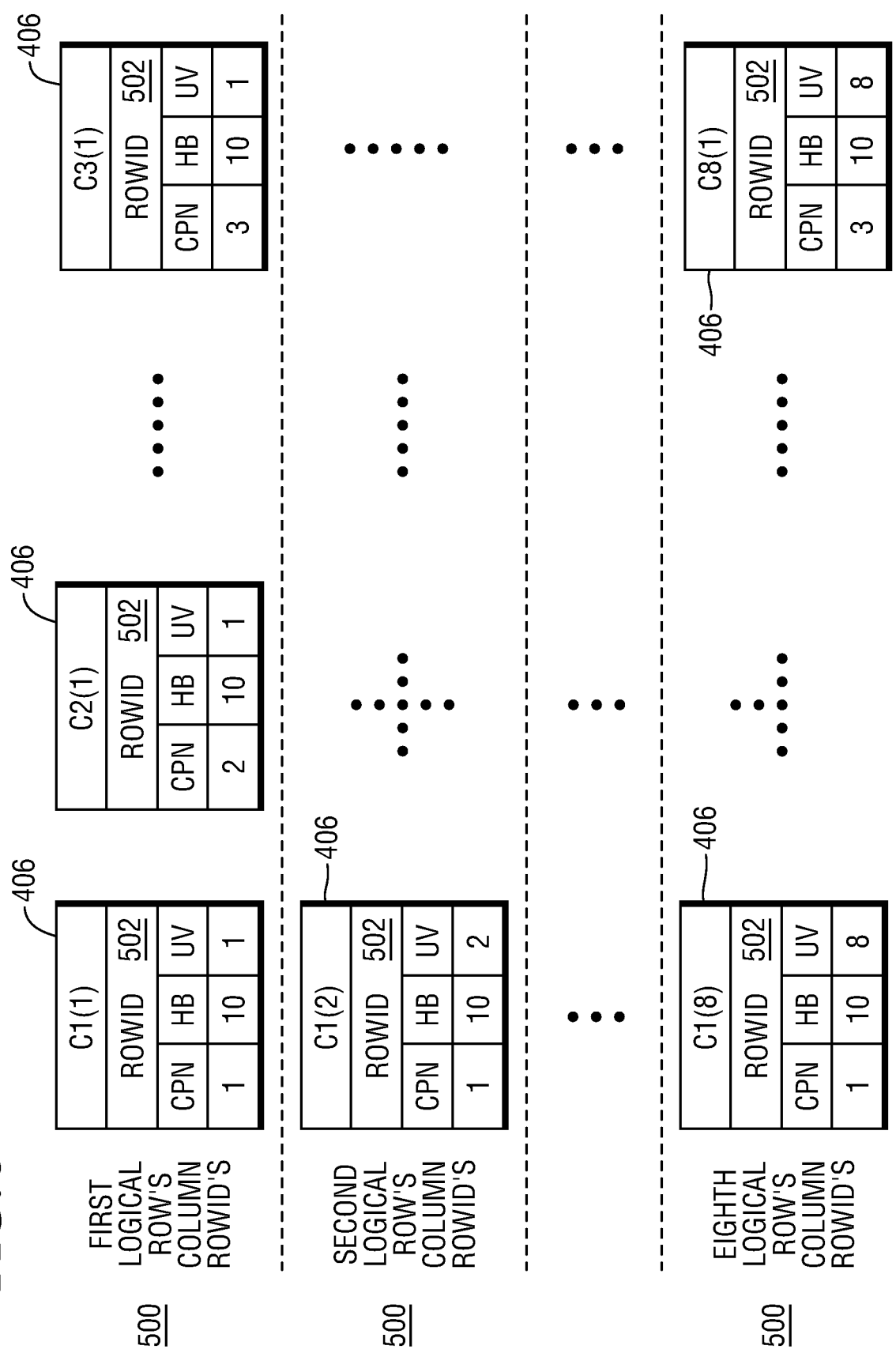
FIG. 5 is an example of a column-partitioned table.

For example, in FIG. 5 table 400 is shown. Each column-partitioned table may be considered to have a "logical row" 500. Thus, while the table is actually partitioned by column, the logical rows give reference to the columns in a row-based environment. In FIG. 5, the columns are partitioned such that there is one column per partition. Thus, each column value in a common column will have the same column partition number (CPN). The rowid 502 of each column value is shown to include the column partition number (CPN). The hash bucket value (HB) may indicate which access module 110 is associated with a particular row for a particular column row. This is typically the same for column-partitioned tables having no primary index. The uniqueness value (UV) allows the column partition value within a particular column partition to be located. For example, the only difference in the rowid's of the first column of table 400 is the uniqueness value. Using this format, a column partition value may be located once the column partition number, hash bucket value, and uniqueness value are known. In the example of FIG. 5, each column partition value 406 may represent a single column value of the table 400. However, in some scenarios, the column partition value 406 may be a concatenation of the multiple column values. In such scenarios, each column value may have a corresponding "fielded" allowing the column value to be located within the particular column partition value.

Figure 6:
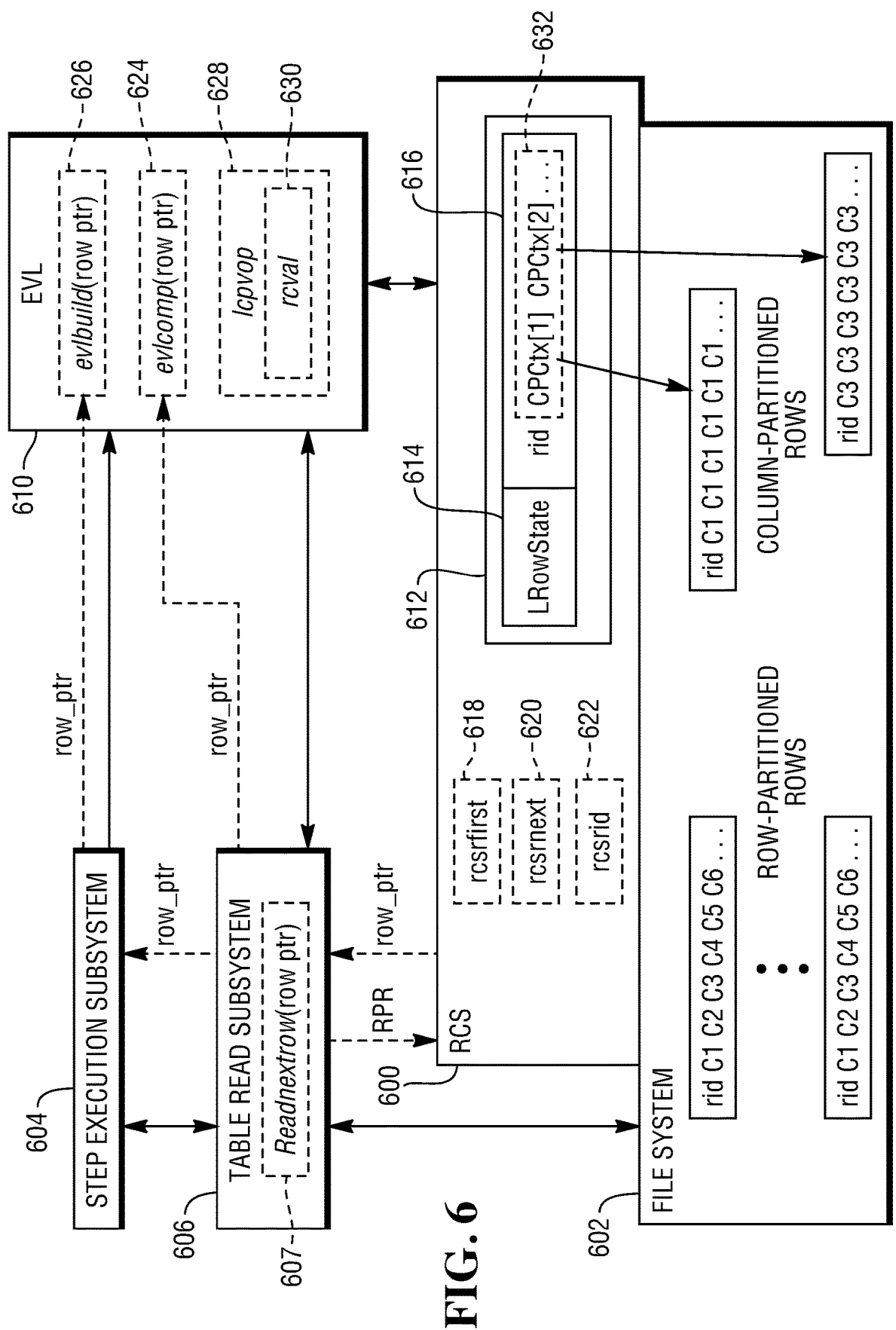
FIG. 6 is an example of a column-partitioned table management software environment implementable on a database system.

FIG. 6 is a block diagram of a row-column subsystem (RCS) 600 that may be used with the file system 602 (which includes DSFs 112) to allow rows of a data table to be assembled with less resource overhead when the data table is column-partitioned. The database system 100 may perform various actions with regard to a row-related query task. For example, a step execution subsystem 604 executed by one or more access modules 110 may be responsible for carrying out each step in responding to a query. In order to carry out these responsibilities, the step execution subsystem 604 may seek out a row pointer (row_ptr) to locate rows needed to respond to the query. The step execution subsystem 604 may interact with a table read subsystem 606, which may be executed by one or more access modules 110, to access a database table. The step execution subsystem 604 may need to read a next row in order to carry out the row-based task. The table read subsystem 606 may return a row pointer (row_ptr) to the step execution subsystem 604 using a function "readnextrow" 607 configured to provide a row pointer to the next row in a database table being accessed.

The table read subsystem 606 may specifically request a row pointer so that the row needed to carry out the row-related task may be located. The table read may be used to read a database table having the rows relevant to the row-related task. In one example, in performing the table read, the table read subsystem 606 may recognize that a table is column partitioned. Thus, row pointers used for non-column-partitioned tables are not applicable. Instead, the table read subsystem 606 may request row pointers to the logical rows associated with column-partitioned tables. In one example, the database system 100 may maintain information about a database table and how it is defined in the data dictionary 122 and the table header for the database table. This information allows the partitioning type of a table to be recognized when the table is being processed.

During the processing of row-related tasks, an evaluator module (EVL) 610, executed by one or more access modules 110, may perform the tasks of evaluating various conditions, such as predicates, in comparison to retrieved rows, as well as building result rows in response to row-related queries. Thus, in operation, the step execution subsystem 604 and the table read subsystem 606 may be responsible for providing the EVL module 610 with row pointers allowing the EVL module 610 to obtain the actual rows of the relevant database tables for subsequent processing.

Upon recognition that rows are needed from a column-partitioned table, the table read subsystem 606 may generate a row pointer request ("RPR") from the RCS 600. The request RPR may specifically request the first non-deleted rowid in a logical row. The RCS 600 may provide a row-level interface to the table read subsystem 606 for the column-partitioned tables. In one example, the RCS 600 may maintain a structure 612. The structure 612 may include a sub-structure LRowState 614 and an array CPCtx 616. The sub-structure 614 may maintain validity of a particular rowid of a logical row and, if valid, the state it is in. Such information may include whether a logical row exists or has been deleted, when the container row 406 with column partition for the logical row of interest have already been located, and if so, whether the column partition value has been located yet or is not within that container row 406. A logical row's rowid and LRowState are set by row-level functions, rcsrfirst 618, rcsrnext 620, and rcsrid 622. The rcsrfist function 618 may be responsible for providing a row pointer to the first non-deleted rowid in a logical row of a relevant table. The rcsrnext 620 may be responsible for providing a row pointer to next non-deleted rowid of the relevant table. The rcsrid function 622 may be responsible for locating the row for a specific logical rowid (for instance, that comes from an index). The array CPCtx 616 contains context information about a particular referenced-column partition and a file context that serves as a cache for the most recent physical row read for the column partition. In other words, the array CPCtx 616 maintains a recent set of column partition values that have already been read from the file system 602.

As table rows are processed, the table read subsystem 606 may call a function evlcomp 624 by the EVL module 610 in which the EVL module 610 determines if a row identified by the row pointer row_ptr qualifies for single-table conditions or join conditions specified in a query being processed. If a row is qualified, the step execution subsystem 604 may call function evlbuild 626 from the EVL 610 to build a result row. Since a logical row does not have actual column values, the EVL 610 may call a function operation lcpvop 628. Internally, the function lcpvop 628 may return a starting address of a column partition value for a logical row's rowid. The function lcpvop 628 may call another function rcval 630 and pass it a value CPCtxIDx 632 that identifies the column partition to read. In one example, CPCtxIDx 632 is an index into the array CPCtx 616 maintained within the logical row. For example, in the array CPCtx 616 in FIG. 6, each array entry CPCtx[1], CPCtx[2], etc., may exist for each column partition that has at least one referenced column. As illustrated in FIG. 6, each instance of CPCtx 616 may contain a physical row from the file system 602.

With the logical row's rowid and a column partition context, the function rcval 630 can determine if another read to the file system 602 needs to be performed to read in the physical row that contains the column partition value for the given rowid and returns the starting address of the column partition value within the container row. Thus, if a physical row containing a column value is already contained within the cache of the array CPCtx 616 in the RCS 600, the function rcval 630 recognizes this, and thus, no read from the file system 602 is required. If the physical row is not in the cache, the file system 602 may be called by the RCS 600 in order to locate and retrieve the physical row. Note that column partitions with no referenced columns for the query do not need to be read by the file system.

As mentioned earlier, the vectorized-processing model enables efficient data read. The Teradata Data Warehouse columnar architecture exploits such a model in also performing data loading. Specifically, scan contexts that buffer many input rows and column-partition contexts that cache many output column values are employed to facilitate vectorization in data loading.

Utilizing column-store tables significantly benefits analytic queries that perform tasks such as individual-column aggregations when the base table contains many columns. This is because by storing values in column-oriented fashion, not only at query runtime, just the columns that are needed by a query will be loaded from disk, but the values can be more effectively compressed, thereby further reducing the I/O overhead in fetching the columns. Furthermore, column-oriented storage enables vectorization of data processing. Essentially, the same sequences of machine instructions can be applied on an array of data. Unlike the traditional iterative query-evaluation model, in which a large sequence of instructions has to be executed for just a single input row, resulting in expensive cache-miss penalties in both instruction and data caches, vectorization provides superior efficiency in both caches.

While the majority of the data in many application domains is row-oriented, columnar databases are often deployed to effect highly efficient analytics. Data in row-oriented tables are normally loaded into the column-oriented counterparts via periodic extraction-transformation-load (ETL) operations.

Unlike conventional row-oriented storage model, wherein new rows are inserted into a table by simply appending the rows to heap files, a column-oriented table requires that each input row to be split into individual values and then store these values separately into the corresponding column storage. The additional tasks of analyzing the input rows, extracting column values, and transforming these values into columnar format collectively introduce inefficiency during the data loading operation.

A common practice to amortizing such overheads is to allow many input rows to be buffered in memory such that the values can be processed and written to disk in a batched fashion. In the Teradata Data Warehouse columnar architecture columnar architecture, scan contexts are employed such that disk blocks from the source table and hence many input rows can be buffered in memory, specifically in the file system cache (FSG). These input rows are then processed into individual output column-values on a per scan-context basis. These output values are then staged into column-partition contexts, which are in-memory buffers that cache values in a column-oriented format. These column contexts enable data to be efficiently loaded into columnar tables.

The techniques discussed below provide various optimizations that further improve the efficiency of the columnar-table data loading operation.

Data Loading in Column-Partitioned Tables

The INSERT-SELECT statement provides an efficient means to loading a column-partitioned table. As introduced earlier, the Teradata Data Warehouse columnar architecture utilizes the column-partition context facility to support efficient data-loading in columnar tables. In particular, each column-partition context represents a single column partition. The column-partition contexts are in-memory buffer space for allocating container rows, such that for each column partition, many container rows can be cached within a memory-residing buffer space. As values are fetched from the source table(s) and appended to the column partitions, container rows are allocated within the column-partition context. When a context reaches its limit on caching container rows, the entire context will be flushed to disk.

Buffering values in column-oriented fashion within an in-memory buffer enables efficient bulk-write of large arrays of values onto disk. In other words, instead of performing small random write operations on a per-value basis, the column partitions can be written to disk in batches.

In addition, the Teradata Data Warehouse FSG facility provides a means for buffering many input rows, allowing them to be efficiently accessed and processed.

Not only does the value-buffering technique benefit the performance of reading input data and writing the output data both in batches, such buffer based technique can be employed throughout other associated tasks during data loading to further improve the overall efficiency of loading data into columnar tables.

Buffered Data Loading

Given that output values are organized in a column-oriented manner within the column-partition contexts, writing column data to disk is highly efficient. The population of these contexts, specifically, the intermediate transformations of these values from the original rows into the final columnar representation presents opportunities for utilizing the buffering mechanism to organize a large number of values according to columns as soon as these individual values are extracted from the input rows.

Algorithm 1, presented below, illustrates a basic implementation of the data loading procedure. This procedure includes reading rows from a source table, extracting individual column values from each source row, appending the extracted values to their corresponding column container, and finally writing the column-partition contexts to disk.

---

Algorithm 1 High-Level Logic for Loading Data into a
Columnar Table

---

```
LoadData(source_table_block,
        source_table_descriptor,
        target_table_descriptor):
    num_source_rows ← GetNumSourceRows(
        source_table_block)
    for i = 1 to num_source_rows do
        src_row_value_refs ←
            ConstructValueReferences(
                GetSourceRow(i, source_table_block))
        for j = 1 to source_table_descriptor.num_columns do
            write_succes ← FALSE
            while AppendValueToColumn(
```

---

Algorithm 1 High-Level Logic for Loading Data into a
Columnar Table

---

```
                target_table_descriptor.column_descriptors[j],
                src_row_value_refs[j],
                need_new_container,
                need_new_context) = FAIL do
            if no_space_in_container then
                need_new_container ← TRUE
            else if column_context_full then
                FlushContextToDisk(column_context)
                need_new_context ← TRUE
            else
                return FAIL
            end if
        end while
    end for
end for
return SUCCESS
```

---

As shown by Algorithm 1, the execution of an INSERT-SELECT statement starts by acquiring a disk block from the source table. The rows stored on this source block are then analyzed in an iterative fashion. Specifically, for each input row, the values of the columns need to be extracted. This is realized by computing the offsets of each value relative to the beginning of each row. Then these addresses, which indicate where the values are located within the source block, are populated into an array, namely src_row_value_refs, by the ConstructValueReferences( ) routine.

Each element within this array is then passed into the AppendValueToColumn( ) routine to be inserted into the corresponding column partition, as shown in Algorithm 2 The AppendValueToColumn( ) routine carries out the following tasks sequentially:

A column_context is created, if one has not been allocated.

A container_row is created, if one has not been allocated.

When the auto-compression feature is enabled on the target columnar table, the corresponding compression technique is applied to the input value.

The resulting compressed value or the original value, if auto-compression is not turned on, is appended to the container_row that is currently active.

If a container_row is full, a new container_row is initialized within the column_context.

If the current column_context is full, in other words, if this context reaches the maximally allowed number of container_rows, the context is flushed to disk.

---

Algorithm 2 High-Level Logic for Appending a Value to a
Column Partition

---

```
AppendValueToColumn(
        column_descripotr, value_ptr,
        need_new_context, need_new_container):
    if need_new_context then
        column_context ← AllocateColumnPartitionContext( )
    end if
    if need_new_container then
        container_row ←
            AllocateColumnContainer(
                column_descriptor, column_context)
    end if
    container_row ←
        GetCurrentActiveContainer(column_context)
    return TryWriteValue(
        value_ptr, container_row)
    TryWriteValue(value_ptr, container_row)
    value_length ← GetValueLength(value_ptr)
```

-continued

Algorithm 2 High-Level Logic for Appending a Value to a
Column Partition

```
if   ContainerHasSpace(container_row, value_length)
then
    if column has autocompress then
        compressed_value ← CompressValue(value_ptr)
        WriteCompressedValue(container_row,
                compressed_value)
    else
        WriteValue(container_row, value_ptr)
    end if
else
    return no_space_in_container
end if
if ColumnContextFull(column_context) then
    return column_context_full
end if
return SUCCESS
```

Note that the AppendValueToColumn( ) routine is invoked on a per-column and per-value basis. The column_context and container_row variables utilized within this routine both correspond to just one column partition.

Within the above enumerated sequence of tasks, many related operations, such as determining whether a value is from a fix-length column or a variable-length column and extracting the length of fix-length values, can be executed instead at the column level, rather than on a per-value basis, which can render the execution inefficient. This is because the execution of such a long sequence of complex functions will leave a large footprint in memory and cache.

After a value is inserted into a particular container, the next value to be inserted will be from a different column and hence inserting this new value will require a different container to be accessed. Furthermore, if the new value is of a different type than the previous one, a different code path will be chosen to perform the insertion. This frequent switching of column containers and code paths incurs significant overhead to both data cache and instruction cache, which can negatively impact the overall data loading performance.

The layout of these values, which is row-first, as the values are obtained from the source table, can be transposed to a column-first layout within a buffer that can accommodate values from many input rows, such that the values belonging to the same column can be stored in consecutive memory space immediately after the values are read from the source table.

This buffer-based enhancement introduces two major advantages. First, the long sequence of functions is no longer executed on a per-value basis. Instead, the values are passed in batches along the tasks, such that each function will process as much data as possible. This enhancement not only improves cache efficiency by vectorizing the execution of tasks, but effectively reduces the number of function calls, in that these functions are no longer invoked for each individual value.

Second, by buffering the values in column-oriented layout, the data-loading associated tasks can be performed on column-at-a-time fashion, thereby significantly improve the efficiency of both instruction and data caches. Moreover, since the values are stored in the buffer in a consistent layout as in the final target containers, efficient bulk-writing can be effected to directly migrate the values in buffer to the containers, resulting in much simpler implementation.

Figure 7:
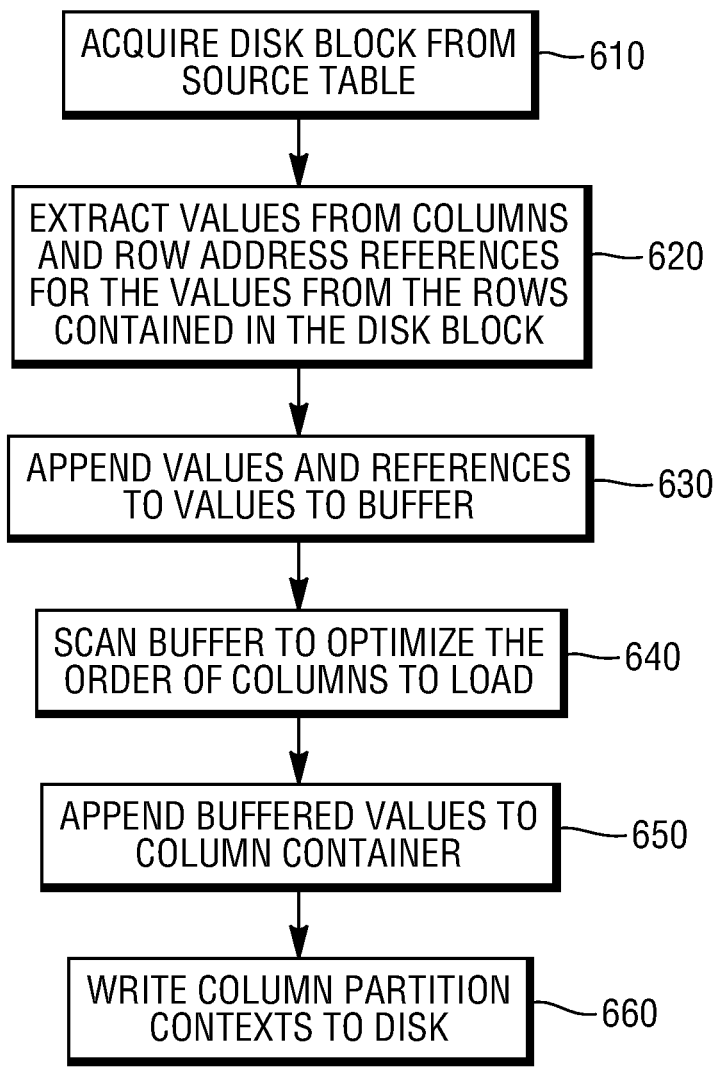
FIG. 7 is a flow diagram illustrating an improved method for loading data into column-partitioned database tables in accordance with the present invention.

FIG. 7 provides a high-level flow diagram of an enhanced procedure process for loading data into column-partitioned database tables. The process begins by acquiring a disk block from the source table in step 610. In step 620, data values and row address references are extracted from the rows contained in the acquired disk block. The extracted values and references are written to buffer memory in step 630. In step 640, data saved to buffer memory can be scanned to group columns according to data types and re-order the sequence in which columns are to be inserted into the database tables. Optimized, reordered, data is organized in column containers and written to the column-partitioned database as shown in steps 650 and 660.

A discussion of the restructuring of the data-loading procedure to incorporate the proposed enhancement, illustrated in Algorithm 3, follows.

Algorithm 3 The Buffer-Based Procedure for Loading
Data into a Columnar Table

```
BufferedLoadData(source_table_block,
            source_table_descriptor,
            target_table_descriptor):
    /* PBV and PBR represent pass-by value and */
    /* pass-by-reference, respectively. */
    (num_PBV_columns, num_PBR_columns) ←
        AnalyzeTable(source_table_descriptor)
    num_source_rows ← GetNumSourceRows(
                source_table_block)
    value_buffer ←
        InitializeBuffer(num_PBV_columns,
                num_source_rows)
    reference_buffer ←
        InitializeBuffer(num_PBV_columns,
                num_source_rows)
    for i = 1 to num_source_rows do
        src_row_value_refs ←
            ConstructRowPointers(
                i, GetSourceRow(source_table_block)[i])
        for j = 1 to num_PBV_columns do
            value_buffer[j][i] ←
                FetchValue(src_row_value_refs[
                    GetOrigColumnID((j, target_table)descriptor)])
        end for
        for j = 1 to num_PBR_columns do
            reference_buffer[j][i] ←
                src_row_value_refs[
                    GetOrigColumnID(j, target_table_descriptor)]
        end for
    end for
    AppendBufferedValuesToColumn(
            target_table_descriptor,
            num_rows,
            num_PBV_columns, num_PBR_columns,
            value_buffer, reference_buffer)
```

As Algorithm 3 illustrates, similarly to Algorithm 1, during data loading the outer loop first iterates through all the source rows. The inner loop subsequently scans through all the columns to extract the values. Nevertheless, instead of calling AppendValueToColumn( ), the BufferedLoadData ( ) routine constructs two buffers, namely value_buffer and reference_buffer, respectively. These two buffers are populated during the execution of the two loops. Note that both buffers are populated in a column-first order. Albeit accessing the buffers in such an order can cause more occurrences of data-cache miss, the overall benefit enabled by the utilization of these buffers can render such negative cache-performance impact trivial.

Both buffers are then passed to an enhanced routine, AppendBufferedValuesToColumn( ), shown in Algorithm 4 With this change, BufferedLoadData( ) reduces the number of calls to the value-appending routine down to just one (from num source rows×num columns previously).

Algorithm 4 The Enhanced Procedure for Appending
Buffered Values into a Columnar Table

```
AppendBufferedValuesToColumn(
        table_descripotr, num_columns,
        num_PBV_columns, num_PBR_columns,
        value_buffer, reference_buffer):
    for i = 1 to num_PBV_columns do
        orig_col_id ← GetOrigColumnID(i, table_descriptor)
        container_row ← GetActiveContainer(
                GetColumnContext(orig_col_id))
        if column not autocompress then
            BulkCopy(value_buffer[i], container_row)
        else
            while value_buffer[i] has remaining values do
                ifTryWriteBufferedValues(
                        value_buffer[failed_value_id],
                        container_row, failed_value_id) = FINISH
                then
                    break
                else
                    HandleError( )
                end if
            end while
        end if
    end for
    for i = 1 to num_PBR_columns do
        orig_col_id ← GetOrigColumnID(i, table_descriptor)
        container_row ← GetActiveContainer(
                GetColumnContext(orig_col_id))
        while reference_buffer[i] has remaining values do
            if TryWriteBufferedValues(
                    reference_buffer[failed_value_id],
                    container_row, failed_value_id) = FINISH
            then
                break
            else
                HandleError( )
            end if
        end while
    end for
```

Column-Type Based Specializations

As discussed above, in the original design, the examination of certain characteristics of the values performed for each value can in fact be equivalently performed during the insert of an entire array of values corresponding to a particular column, as the enhanced value-appending routine now permits.

This observation results in a further enhancement that specializes the functions invoked to insert columns of various types. Given the fact that the control flows of these functions during execution differ primarily on whether a column is of fixed-length or variable-length, two sets of specialized functions are constructed, with each set tailored to a particular type of column.

The values within a source row are represented by their references, i.e., 64-bit addresses, on the disk block from the source table. Just the final value-appending routine needs to dereference these addresses to access the actual values. This late value-dereferencing implementation avoids many intermediate expensive memory-copy operations that transport values from the source rows located on the disk blocks along the sequence of tasks performed by the data loading-related routines.

For fix-length columns, additional optimization opportunities are available. In particular, for fix-length values that require less than eight bytes to store, representing them with 8-byte addresses requires extra memory space. Instead, for such short values, the values can be directly copied into the buffer and the value-appending routine can then access these values without having to obtain them from the disk block. This enhancement simplifies the implementation of the value-fetching routine for fix-length columns that are up to eight bytes in width. In addition, directly storing short values in the buffer helps reducing the size of buffer. Thereafter, as shown in Algorithm 3, two separated buffers are utilized. In particular, the value_buffer is employed to directly store the above described short values. Such columns are referred to as pass-by-value (PBV) columns. The reference_buffer on the other hand, is utilized to store values from other types of columns, which are collectively referred to as pass-by-reference (PBR) columns.

Optimize the Order of Columns to Load

For a columnar table, the order of columns in which values are appended need not be the same as specified by the CREATE TABLE DDL statement. This observation yields another optimization.

As discussed earlier, appending values to columns involves many functions to be sequentially executed. The code path chosen at runtime to perform the tasks primarily depends on the types of the columns, specifically, whether a column is fixed-length or variable-length, pass-by-value or pass-by-reference, and with compression or without compression.

It is beneficial to choose an order such that the values of homogeneous columns according to the above criteria are loaded consecutively. If the columns are loaded in an alternating fashion instead, in other words, if the column currently being inserted is of a different type than the previous column and the next column is also of a different type than the current column, the code paths will be different each time a column is inserted. Moreover, since the two buffers store all the values on just one disk block, and realistically a table can occupy millions of disk blocks, alternating the execution paths at the disk block-level can be very frequent, thereby degrading instruction-cache performance.

To address this inefficiency, the columns can be grouped by their types. This optimization in column order allows the same code paths to be retained in effect for maximized periods of time. In addition, since the actual values of those PBV columns are stored while still accessing the disk blocks for PBR columns, inserting these two types of columns separately can help improving data-cache performance.

Auto-Compression in Column Containers

The auto-compression feature in the Teradata Data Warehouse columnar architecture provides significant reduction in storage requirement for columnar tables, which effectively reduces I/O overhead during query evaluations.

When auto-compression is disabled, the source values need not be processed one at a time by the compression routine. Instead, as briefly mentioned in Section 3.1, in the value_buffer, an entire array of values corresponding to a particular column can be directly copied to the target column container.

Note that this column-wise value copying technique requires that the input array consists of actual values instead of references. Thereafter, this technique is only applicable to the PBV columns.

A challenge raised by this column-wise copying approach is that the size of the input value_buffer, which contains the source values, and the size of the container row, to which the values are written, can often differ. As discussed earlier, the input buffer's size is determined by the number of rows that are present on each disk block from the source table. The number of values allowed on a container row on the other hand is computed by $(B-\eta)/\upsilon$, in which B is the size of the disk block, $\eta$ is the size of the container-row header, and $\upsilon$ is the size of the value.

Unlike the row-at-a-time approach, in which the free space within a container row is maintained incrementally as values are appended, to effect column-wise value copying, special attention is needed each time copy is performed. In particular, if the currently active container-row still has free space, how many values this free space can accommodate needs to be computed. Then just the allowed number of values from value_buffer are copied into the container and the container closed. The remaining values in value_buffer are then copied into a newly allocated container. When the values, which correspond to a specific column, from the current value_buffer are all appended, the size of the free space is recorded in the active container, which will then be consulted when appending the next batch of input values.

It is a more challenging scenario when auto-compression is enabled, in that each input value has to be compressed individually. Although this restriction makes it difficult to directly copy an entire array of values to the containers, the value-buffering strategy can be applied all the way down to right before an individual value is going to be compressed.

As shown in Algorithm 1, the LoadData( ) routine repeatedly invokes the AppendValueToColumn( ) routine until the callee successfully returns. AppendValueToColumn( ) invokes a routine, namely TryWriteValue( ). Note that TryWriteValue( ) is also invoked on a per-value basis. This routine first tries to compress the input value. Then the compressed value is analyzed to determine whether it can be appended to the corresponding active container. If there is not enough space left in the container, TryWriteValue( ) returns an error to AppendValueToColumn( ), which then passes the error to LoadData( ). LoadData( ) then attempts to remedy the error. In this case, when no space is left in the container, a new container will be allocated. Upon finishing the error-handling, TryWriteValue( ) will be invoked again to try compressing and then appending the input value.

Similar to AppendValueToColumn( ), during data loading, the TryWriteValue( ) routine is often invoked a large number of times. To minimize such an overhead in performing value-compression and writing, the same value-buffering principle is used to pass an array of values corresponding to a specific column into an enhanced TryWriteBufferedValues( ) routine, as presented in Algorithm 5 This new routine then iterates through the input value-array and performs compression and writing the resulting values to the container rows. The iteration is interrupted when an error occurs. At that point, TryWriteBufferedValues( ) re-turns an error code along with an identifier to the failing value within the input value-array. The caller then performs remedy actions as before, such as allocating a new container row. Once the error is successfully addressed, TryWriteBufferedValues( ) will resume execution from the previously failing value. This improvement effectively reduces the number of calls to the value-writing routine, which can also improve code and data locality.

Algorithm 5 The Enhanced TryWriteBufferedValues Routine

```
TryWriteBufferedValues(
    value_array, container_row, failed_value_id)
if column has autocompress then
```

Algorithm 5 The Enhanced TryWriteBufferedValues Routine

```
    for i = 1 to GetNumValues(value_array[i]) do
        value_length ← GetValueLength(value_ptr)
        ifContainerHasSpace(container_row, value_length)
        then
            WriteCompressedValue(container_row,
                CompressValue(value_array[i]))
        else
            failed_value_id ← i
            return no_space_in_container
        end if
    end for
else
    for i = 1 to GetNumValues(value_array) do
        value_length ← GetValueLength(value_array[i])
        ifContainerHasSpace(container_row, value_length)
        then
            WriteValue(container_row,
                value_array[i])
        else
            failed_value_id ← i
            return no_space_in_container
        end if
    end for
end if
if ColumnContextFull(column_context) then
    return column_context_full
end if
return FINISH
```

A variety of enhancements applied in concert to the original AppendValueToColumn( ) and TryWriteValue( ) routines have been presented. The newly designed routines presented in Algorithm 4 and Algorithm 5 are named AppendBufferedValuesToColumn( ) and TryWriteBufferedValues( ), respectively. The value-buffering strategy is reflected by the new routines in the following manners.

First, two buffers, namely value_buffer and reference_buffer, are established to store actual values and references to values, respectively.

Second, AppendBufferedValuesToColumn( ) scans the input buffers in a column-first fashion. In addition, the examination of certain characteristics for each individual column is performed only within the outer loop, thereby eliminating the overhead of performing the checks for on a per-value basis.

Finally, the TryWriteBufferedValues( ) routine is invoked within the outer loop for each column.

What is claimed is:

1. In a database system including a processor and data storage devices, said database system employing a column-oriented storage model whereby data is saved within column-partitioned database tables, a method of loading data into a column-partitioned database table, the method comprising:
   reading, by a processor, rows from a row-oriented source table,
   extracting, by said processor, individual column data values from said rows,
   writing, by said processor, said column data values in a column-first order to a buffer memory;
   allocating, by said processor, said column data values contained within said buffer memory to column containers;
   determining, by said processor, an optimized sequence in which said column containers are to be written to said column-partitioned database table; and writing, by said processor, said column containers to said column-partitioned database table in accordance with said optimized sequence.

2. The method of claim 1, wherein said optimized sequence in which said column containers are written to said column-partitioned database table is determined by evaluating column types associated with said column data values written to said buffer memory.

3. The method of claim 2, wherein said column types include fixed-length columns and variable-length columns.

4. The method of claim 2, wherein said column types include compressed data columns and uncompressed data columns.

5. The method of claim 1, wherein said column containers are written to said column-partitioned database table when said buffer memory attains a full state.

6. In a database system including a processor and data storage devices, said database system employing a column-oriented storage model whereby data is saved within column-partitioned database tables, a method of loading data into a column-partitioned database table, the method comprising:
   reading, by a processor, rows from a row-oriented source table;
   identifying, by said processor, individual column data values from said rows;
   writing, by said processor, references to said column data values to a buffer memory, said references written to said buffer memory in a column-first order;
   using said references to said column data values, obtaining, by said processor, said column data values from said row-oriented source table;
   allocating, by said processor, said column data values to column containers;
   determining, by said processor, an optimized sequence in which said column containers are to be written to said column-partitioned database table; and
   writing said column containers to said column partitioned database table within a data storage device in accordance with said optimized sequence.

7. The method of claim 6, wherein said optimized sequence in which said column containers are written to said column-partitioned database table is determined by evaluating column types associated with said references to column data values written to said buffer memory.

8. The method of claim 6, wherein:
   said step of identifying individual column data values from said rows includes identifying column data values which are short values; and
   said step of writing references to said column data values to a buffer memory includes, for said short values, writing the column data values associated with the short values to said buffer memory.

9. A database system including:
   a storage device configured to store a plurality of database tables, wherein at least a portion of the database tables are column-partitioned database tables;
   a processor in communication with the storage device, said processor executing a data loading procedure for:
      reading rows from a row-oriented source table;
      extracting individual column data values from said rows;
      writing said column data values in a column-first order to a buffer memory;
      allocating said column data values contained within said buffer memory to column containers;
      determining an optimized sequence in which said column containers are to be written to said column-partitioned database table; and
      writing said column containers to said column-partitioned database table in accordance with said optimized sequence.

10. The database system of claim 9, wherein said optimized sequence in which said column containers are written to said column-partitioned database table is determined by evaluating column types associated with said column data values written to said buffer memory.

11. The database system of claim 10, wherein said column types include fixed-length columns and variable-length columns.

12. The database system of claim 10, wherein said column types include compressed data columns and uncompressed data columns.

13. The database system of claim 9, wherein said column containers are written to said column-partitioned database table when said buffer memory attains a full state.

14. A database system including:
   a storage device configured to store a plurality of database tables, wherein at least a portion of the database tables are column-partitioned database tables;
   a processor in communication with the storage device, said processor executing a data loading procedure to:
      read rows from a row-oriented source table;
      identify individual column data values from said rows;
      write references to said column data values to a buffer memory, said references written to said buffer memory in a column-first order;
      using said references to said column data values, obtain said column data values from said row-oriented source table;
      allocate said column data values to column containers;
      determine an optimized sequence in which said column containers are to be written to said column-partitioned database table; and
      write said column containers to said column partitioned database table within a data storage device in accordance to said optimized sequence.

15. The database system of claim 14, wherein said optimized sequence in which said column containers are written to said column-partitioned database table is determined by evaluating column types associated with said references to column data values written to said buffer memory.

16. The database system of claim 14, wherein:
   said identifying individual column data values from said rows includes identifying column data values which are short values; and
   writing references to said column data values to a buffer memory includes, for said short values, writing the column data values associated with the short values to said buffer memory.

* * * * *